(12) United States Patent
Lindsay

(10) Patent No.: US 8,251,427 B2
(45) Date of Patent: Aug. 28, 2012

(54) VEHICLE SEATING ARRANGEMENT INCLUDING A COLLAPSIBLE SEAT

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 12/699,654

(22) Filed: Feb. 3, 2010

(65) Prior Publication Data
US 2011/0187146 A1    Aug. 4, 2011

(51) Int. Cl.
*B60N 2/30* (2006.01)
*B60N 2/06* (2006.01)
*B60N 2/01* (2006.01)

(52) U.S. Cl. .................. 296/65.11; 296/64; 297/234

(58) Field of Classification Search .............. 296/65.11, 296/64, 69, 65.01, 65.13, 65.14, 65.16, 65.18; 297/233, 239, 248, 249, 257
See application file for complete search history.

(56) References Cited

U.S. PATENT DOCUMENTS

| 1,133,500 | A | 3/1915 | Pollard |
| 2,116,366 | A | 5/1938 | Scott |
| 2,292,586 | A | 8/1942 | Thompson |
| 5,797,649 | A * | 8/1998 | Snell et al. ................... 297/14 |
| 6,648,393 | B1 * | 11/2003 | Milnar et al. ............ 296/65.11 |
| 7,070,230 | B2 | 7/2006 | Chen |
| 7,137,663 | B2 | 11/2006 | Tsujibayashi et al. |
| 7,341,302 | B2 * | 3/2008 | Slade ..................... 296/65.01 |
| 7,393,038 | B2 * | 7/2008 | Yajima et al. ............ 296/65.03 |
| 7,578,536 | B2 * | 8/2009 | Yajima et al. ............ 296/65.03 |
| 7,578,551 | B2 * | 8/2009 | Linero ....................... 297/107 |
| 7,954,872 | B2 * | 6/2011 | Lindsay ...................... 296/64 |
| 2008/0185893 | A1 | 8/2008 | Behrens et al. |
| 2008/0238125 | A1 * | 10/2008 | Mahaffy .................. 296/65.09 |
| 2009/0008975 | A1 * | 1/2009 | Behrens et al. ............. 297/236 |

* cited by examiner

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A seating arrangement for a row of seats in a vehicle includes a right seat connected with a vehicle body of the vehicle, a left seat connected with the vehicle body, and a middle seat positioned between the right seat and the left seat. At least one of the right seat and the left seat is moveable in a lateral direction with respect to the other seat and the vehicle body. Movement of the at least one seat toward the other seat can collapse the middle seat.

15 Claims, 6 Drawing Sheets

VEHICLE SEATING ARRANGEMENT INCLUDING A COLLAPSIBLE SEAT

BACKGROUND

This disclosure relates to a seating arrangement for a vehicle. More specifically, this disclosure is related to a seating arrangement for a vehicle having a rear seat, such as a sport utility vehicle ("SUV") or a van, including a mini-van.

To provide flexibility among seating arrangements for a row of seating, it is typical to offer a consumer different options such as a removable center seat, a two-person bench, captain's chairs or a three-person bench. These options are offered at the point of sale for the vehicle. Such seating arrangements provide consumer choice at the time of sale because the consumer can choose a particular seating arrangement when purchasing the vehicle.

Offering a two-passenger or a three-passenger seating arrangement at the point of sale offers a choice to the consumer, but provides the consumer no flexibility after the vehicle is purchased. A removable center seat can provide greater flexibility than a three-person bench, but the removed center seat must be removed and stored, which is not user friendly. Also, a removable center seat also has a cost and weight increase associated with the extra slide rails, recliners, vertical frame members and other components associated with the removable seat.

SUMMARY

An example of a vehicle including a seating arrangement that can overcome at least some of the aforementioned shortcomings includes a first seat connected with a vehicle body of the vehicle and a collapsible seat connected with the vehicle body. The collapsible seat is disposed adjacent the first seat and movable from an uncollapsed state to a collapsed state. The collapsible seat includes a right seat section defining a right surface and a left seat section defining a left surface. The surfaces are configured to contact an associated occupant of the collapsible seat when the collapsible seat is in the uncollapsed state. The right seat base section folds toward the left seat base section when a lateral force is applied to the collapsible seat by the first seat contacting the collapsible seat.

Another example of a vehicle including a seating arrangement that can overcome at least some of the aforementioned shortcomings includes a right seat connected with a vehicle body of the vehicle, a left seat connected with the vehicle body, and a middle seat positioned between the right seat and the left seat. At least one of the right seat and the left seat is moveable in a lateral direction with respect to the other seat and the vehicle body. Movement of the at least one seat toward the other seat results in a lateral force being applied to the middle seat to collapse the middle seat.

An example of a collapsible vehicle seat includes a seat base and a seat back connected with the seat base. The seat base includes a right seat base section defining a right seating surface, a left seat base section defining a left seating surface, a right seat base frame member in the right seat base section, and a left seat base frame member in the left seat base section. The right seat base frame member pivotally connects with left seat base frame member for allowing the right seat base section to pivot toward the left seat base section. The seat back includes a right seat back section defining a right back-resting surface, a left seat back section defining a left back-resting surface, a right seat back frame member in the right seat back section, and a left seat back frame member in the left seat back section. The right seat back frame member being pivotally connects with the left seat back frame member for allowing the right seat back section to pivot toward the left seat back section.

DETAILED DESCRIPTION

Figure 1:
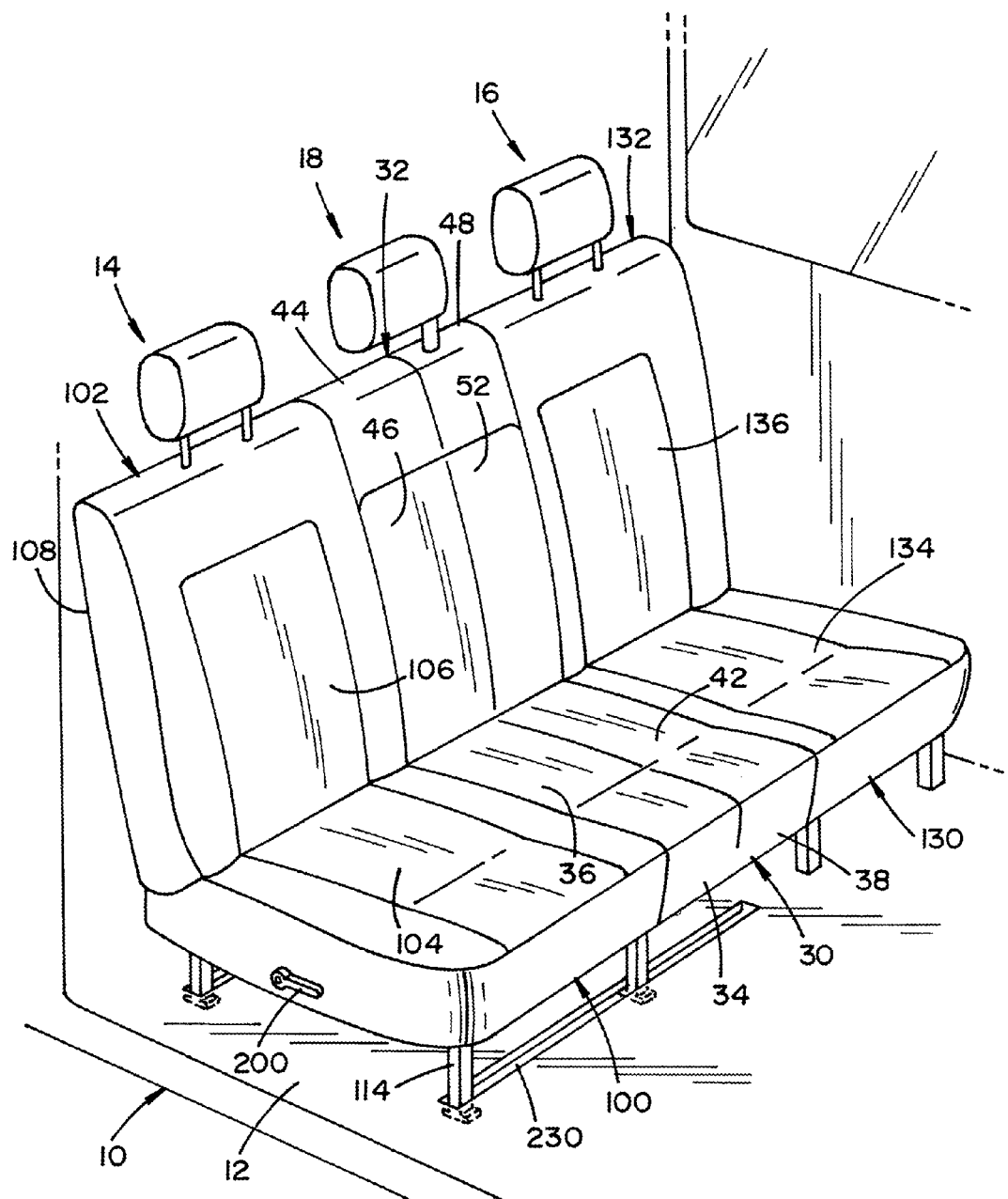
FIG. 1 is a perspective view of a row of seats in a vehicle in a three-passenger mode seating arrangement.

With reference to FIG. 1, a vehicle body 10 for a motor vehicle (only a portion of which is shown in FIG. 1) such as a van, mini-van or SUV, includes a vehicle floor 12 upon which a plurality of vehicle seats, e.g. a first seat 14, a second seat 16 and a third seat 18 are mounted. The vehicle, as is conventional, can include a plurality of wheels (not shown) driven by an engine (not shown). FIG. 1 depicts a row of seats that are situated behind the driver's seat (not shown). In the illustrated embodiment, the right seat 14 connects with the vehicle body 10, the left seat 16 connects with the vehicle body, and the middle seat 18 is positioned between the right seat and the left seat. In the illustrated embodiment, the middle seat 18 is a collapsible seat; however, the collapsible seat 18 could be positioned elsewhere with respect to the other seats. For example, the right seat or the left seat could be collapsible. Also fewer or greater than three seats could be provided. The collapsible seat 18 connects with the vehicle body 10, and in the depicted embodiment is disposed adjacent the right seat 14 and the left seat 16. The collapsible seat 18 is movable from an uncollapsed state (depicted in FIG. 1) to a collapsed state (depicted in FIG. 2) when a lateral force is applied to the collapsible seat by one of the seats, which in the depicted embodiment is the right seat 14 or the left seat 16.

Figure 2:
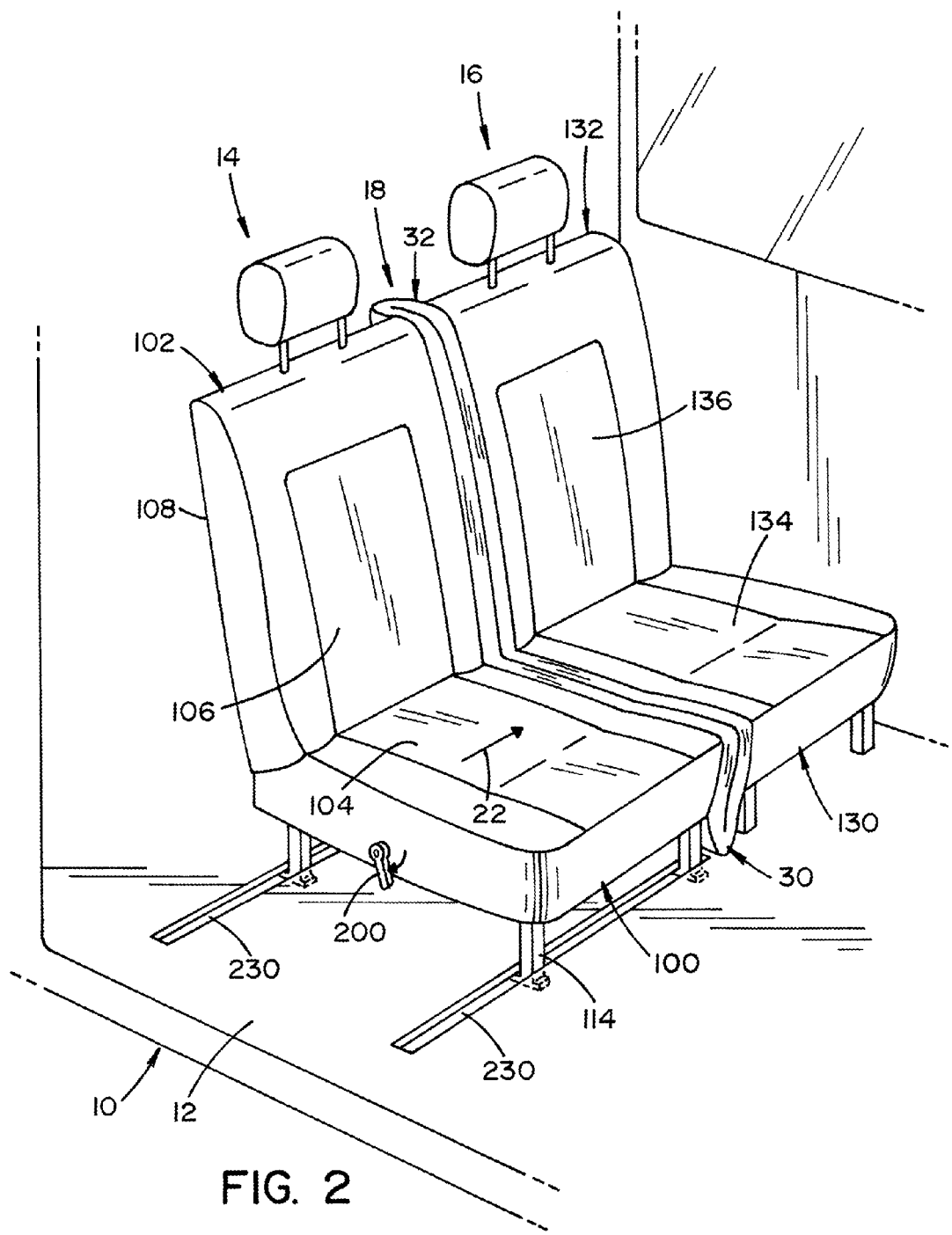
FIG. 2 is a perspective view of the row of seats depicted in FIG. 1 in a two-passenger mode.

As illustrated in FIG. 2, at least one of the right seat 14 and the left seat 16 is movable in a lateral direction with respect to the other seat and the vehicle body 10. Movement of the one seat, e.g. the right seat 14, toward the other seat, e.g. the left seat 16, results in a lateral force in the direction of arrow 22 being applied to the middle seat 18, which collapses the middle seat 18 reducing the lateral distance between the right seat and the left seat, which is shown in FIG. 2.

With reference to FIG. 2 the right seat 14 is movable in a lateral direction (depicted as arrow 22) with respect to the left seat 16 and the vehicle body 10. If desired, the left seat 16 can be moveable in the lateral direction, which would be in a direction opposite to the arrow 22, with respect to the right seat 14 and the vehicle body 10. Movement of the right seat 14 or the left seat 16 toward the other seat collapses the middle seat 18 reducing the lateral distance between the right seat and the left seat. Accordingly, the illustrated vehicle seating arrangement can change from a three-passenger mode, which is shown in FIG. 1, to a two-passenger mode, which is shown in FIG. 2.

With reference back to FIG. 1, the middle seat 18 includes a middle seat base 30 and a middle seat back 32 that can be pivotally connected with the middle seat base to allow the seat back to fold toward the seat base in a conventional manner. In the illustrated embodiment, the middle seat 18 includes a right seat base section 34 defining a right seating surface 36 and a left seat base section 38 defining a left seating surface 42. When the middle seat 18 is not collapsed, e.g. in an uncollapsed state, and the middle seat back 32 is upright, such as that shown in FIG. 1, the seating surfaces 36 and 42 are configured to contact an occupant of the middle seat 18 and will typically contact the legs of the occupant.

Figure 6:
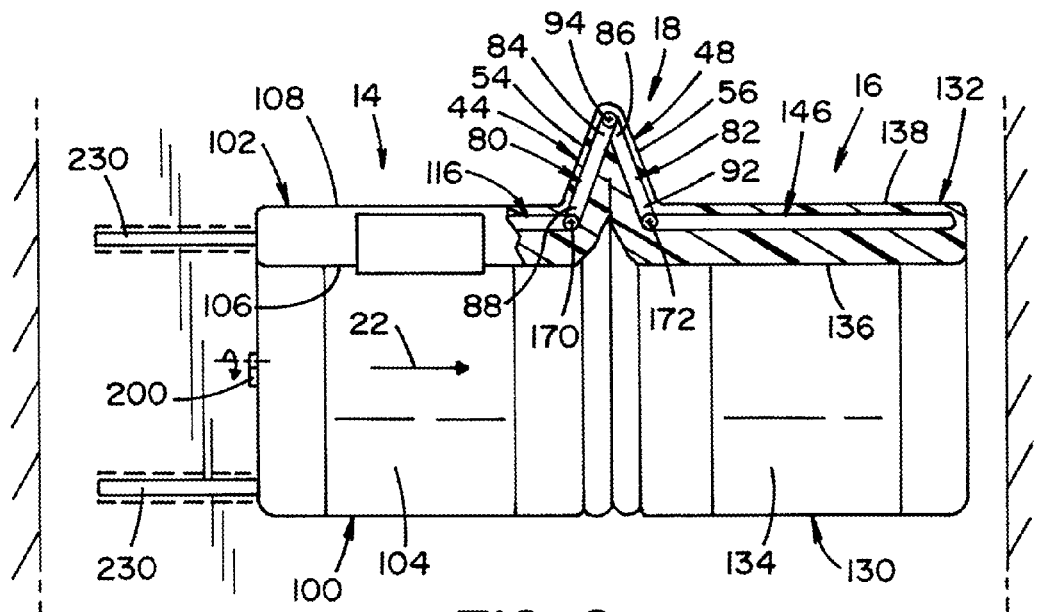
FIG. 6 is a cross-sectional view taken along lines 6-6 in FIG. 4.

The middle seat 18 also includes a right seat back section 44 defining a right back-resting surface 46 and a left seat back section 48 defining a left back-resting surface 52. The back-resting surfaces 46 and 52 are configured to contact the occupant of the middle seat 18, more particularly the back of the occupant. The seating surfaces 36 and 42 and the back-resting surfaces 46 and 52 can also be referred to as occupant-supporting surfaces. As seen in FIG. 6, the right seat back section 44 also defines a middle seat right rear surface 54 and the left seat back section 48 defines a middle seat left rear surface 56.

In the illustrated embodiment, the right seat base section 34 and the left seat base section 38 are separated by a generally vertical plane at the lateral center of the middle seat 18. This vertical plane also separates the right seat back section 44 from the left seat back section 48. Movement of the right seat 14 toward the left seat 16, or vice versa, results in the right seating surface 36 moving towards facing the left seating surface 42 and the right back-resting surface 46 moving towards facing the left back-resting surface 52. This is shown in FIG. 2. If desired, however, the right seating surface 36 can move so that the right seating surface faces away from the left seating surface 42 and the right back-resting surface 46 can move so that it faces away from the left back-resting surface 52. As is also apparent in FIG. 2, the middle seat back 32 remains upright when the middle seat 18 is in the collapsed position.

The middle seat 18 also includes a frame, which can function similarly to a conventional frame by supporting cushions and upholstery of the middle seat. Only portions of the middle seat frame are shown in FIGS. 3-7; however, the portions of the frame that are not shown in figures can be similar to conventional vehicle seat frames.

The middle seat 18 includes a right base frame member 60 pivotally attached to a left base frame member 62. The right base frame member 60 has a first end 64 and the left base frame member 62 has a first end 66. The right base frame member 60 connects with the left base frame member 62 adjacent the first end 64 of the right base frame member and adjacent the first end 66 of the left base frame member. The first ends 64 and 66 of the respective base frame members 60 and 62 are laterally centrally located on the middle seat 18 in the illustrated embodiment. The right base frame member 60 also includes a second end 68 opposite the first end 64. The left base frame member 62 also includes a second end 72 (FIG. 4) opposite the first end 66. The right base frame member 60 pivotally attaches to the left base frame member 62 for rotation about a pivot axis 74 that is generally perpendicular to the lateral direction (arrow 22 in FIG. 2). The base frame members 60 and 62 in the illustrated embodiment are rigid bar-shaped or rod-shaped members that are elongated in the lateral direction. Each base frame member 60 and 62 can also be diagonally oriented, e.g. transverse to the lateral direction while remaining generally parallel to the vehicle floor 12 when the middle seat 18 is in the uncollapsed state. In the illustrated embodiment, when in the three-passenger mode (shown in FIG. 3) each of the base frame members 60 and 62 are generally horizontally oriented.

Figure 5:
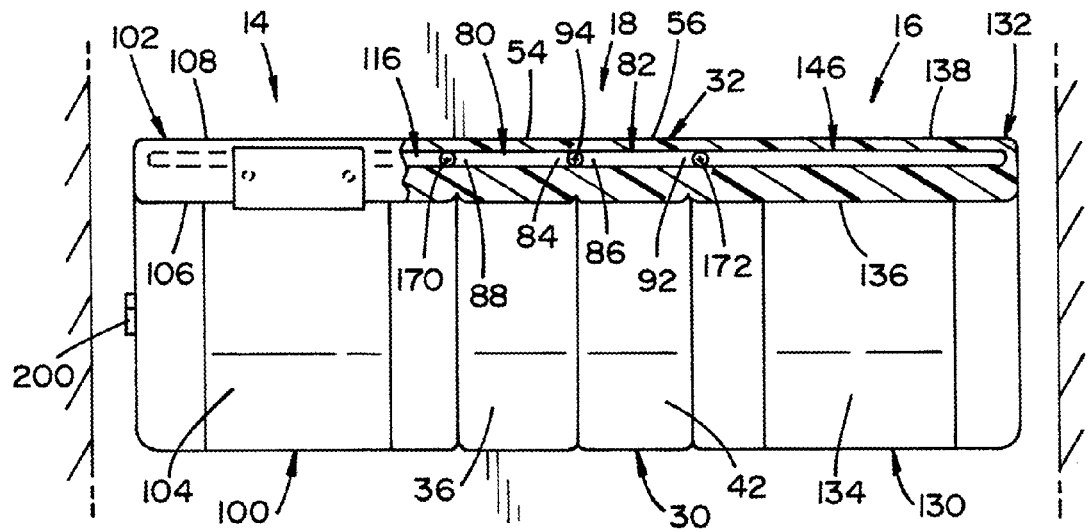
FIG. 5 is a cross-sectional view taken along lines 5-5 in FIG. 3.

With reference to FIGS. 5 and 6, the middle seat 18 also includes a right back frame member 80 pivotally attached to a left back frame member 82. The right back frame member 80 includes a first end 84 and the left back frame member 82 includes a first end 86. The right back frame member 80 connects with the left back frame member 82 adjacent the first end 84 of the right back frame member and adjacent the first end 86 of the left back frame member. The first ends 84 and 86 of the respective back frame members 80 and 82 are laterally centrally located on the middle seat 18 in the illustrated embodiment. The right back frame member 80 also includes a second end 88 opposite the first end 84. The left back frame member 82 also includes a second end 92 opposite the first end 86. The right back frame member 80 pivotally attaches to the left back frame member 82 for rotation about a pivot axis 94 that is generally perpendicular to the lateral direction (arrow 22 in FIG. 2). The back frame members 80 and 82 can also be rigid bar-shaped or rod-shaped members. In the illustrated embodiment, each of the back frame members 80 and 82 are generally horizontally oriented; however, back frame members 80 and 82 can also be diagonally oriented.

With reference back to FIG. 1, the right seat 14 includes a seat base 100 and a seat back 102 that can be pivotally connected to the seat base to allow the seat back to fold toward the seat base in a conventional manner. The right seat base 100 defines a right seat seating surface 104 and the right seat back 102 defines a right seat back-resting surface 106. The right seat back 102 also includes a right seat rear surface 108. The right seat 14 also includes a seat frame, which can be similar to known seat frames by supporting the cushions and upholstery for the right seat. Only a portion of the right seat frame is shown in FIGS. 3-7; however, the portions of the right seat frame that are not depicted can be similar to known seat frames.

Figure 3:
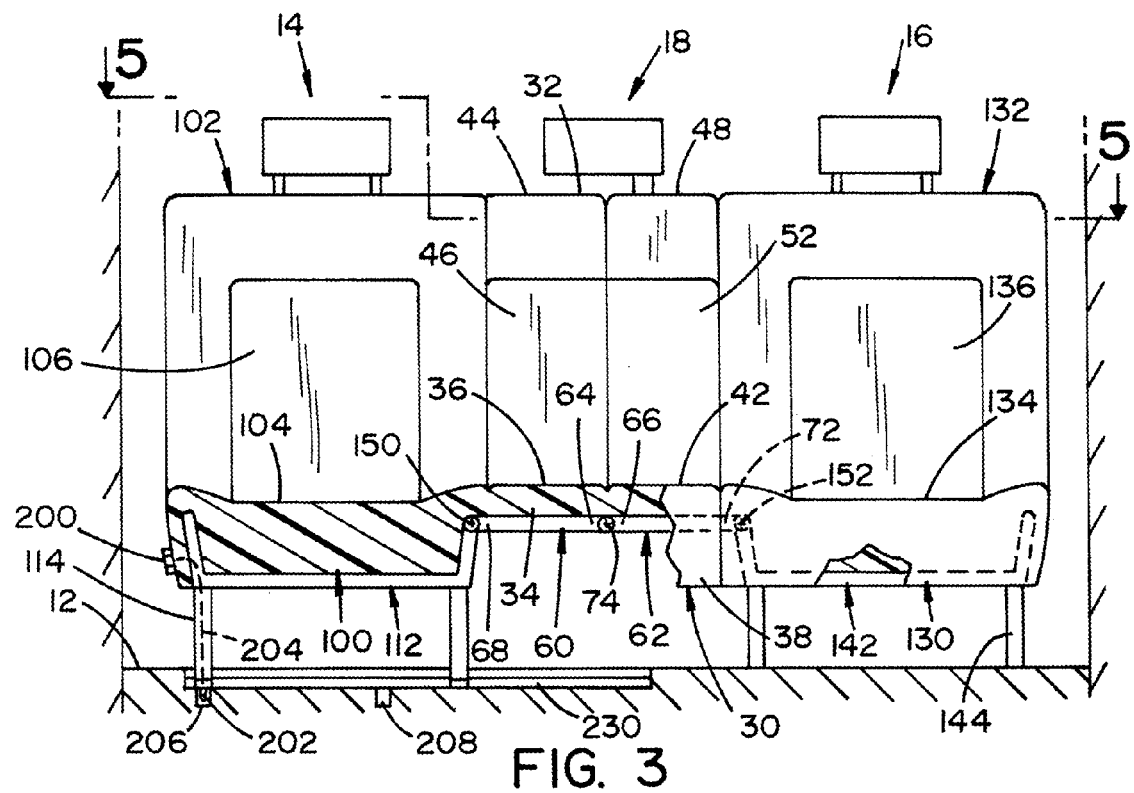
FIG. 3 is an elevation view, partially in cross section, of the vehicle seating arrangement as depicted in FIG. 1.

With reference to FIG. 3, the right seat 14 includes a right seat base frame member 112. Right seat legs 114 extend downwardly from the right seat base frame member 112 for connecting the right seat 14 to the vehicle floor 12. The right seat base frame member 112 can be made from a rigid bar-shaped or rod-shaped member. With reference to FIG. 5, the right seat 14 can also include a right seat back frame member 116. The right seat back frame member 116 can also be made from a rigid bar-shaped or rod-shaped member. The right seat base frame member 112 can connect with the right seat back frame member 116 in a manner similar to known seat frames, for example additional frame members can be provided to connect the right seat base frame member 112 to the right seat back frame member 116.

With reference back to FIG. 1, the left seat 16 includes a seat base 130 and a seat back 132 that can be pivotally connected to the seat base to allow the seat back to fold toward the seat base in a conventional manner. The left seat base 130 defines a left seat seating surface 134 and the left seat back 132 defines a left seat back-resting surface 136. The left seat back 132 also includes a left seat rear surface 138. The left seat 16 also includes a seat frame, which can be similar to known seat frames by supporting the cushions and upholstery for the left seat. Only a portion of the left seat frame is shown in FIGS. 3-7; however, the portions of the left seat frame that are not depicted can be similar to known seat frames.

Figure 4:
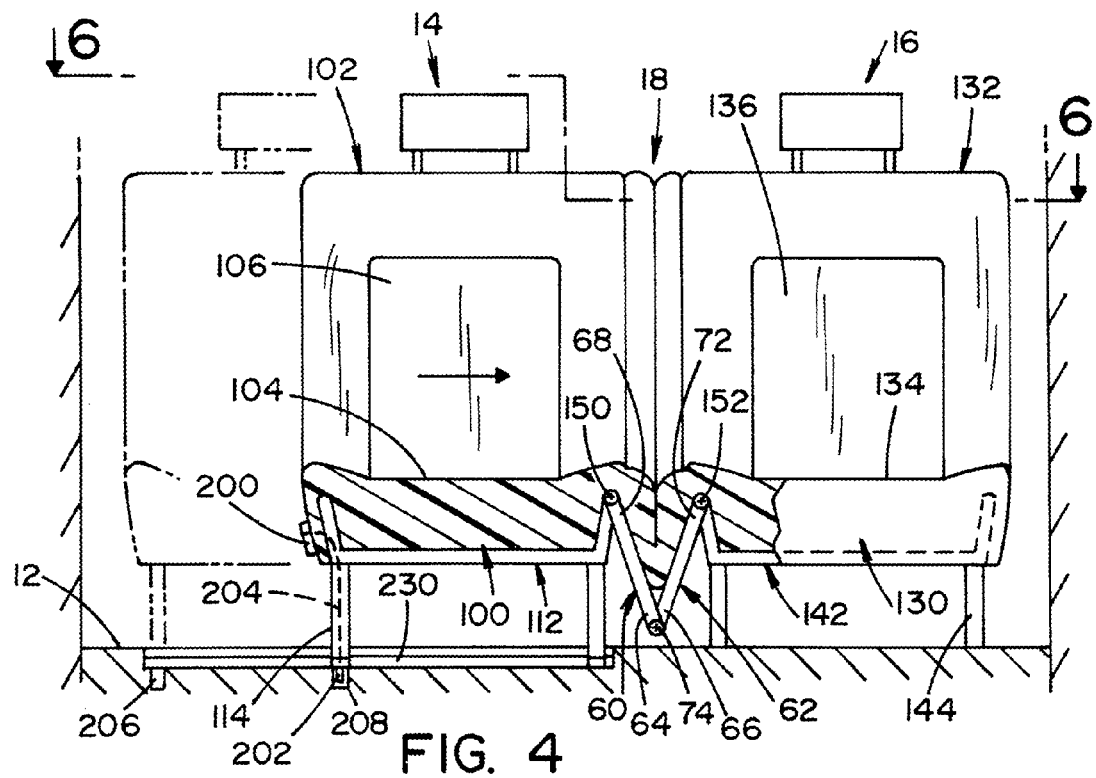
FIG. 4 is an elevation view, partially in cross section, of the vehicle seating arrangement as depicted in FIG. 2.

With reference to FIG. 4, the left seat 16 includes a left seat base frame member 142. Right seat legs 144 extend downwardly from the left seat base frame member 142 for connecting the left seat 16 to the vehicle floor 12. The left seat base frame member 142 can be made from a rigid bar-shaped or rod-shaped member. With reference to FIG. 5, the left seat 16 can also include a left seat back frame member 146. The left seat back frame member 146 can also be made from a rigid bar-shaped or rod-shaped member. The left seat base frame member 142 can connect with the left seat back frame member 146 in a manner similar to known seat frames.

With reference back to FIG. 3, as discussed above the right seat 14 includes a right seat frame, which includes the right seat base frame member 112, and the left seat 16 includes a left seat frame, which includes the left seat base frame member 142. The right base frame member 60 of the middle seat 18 pivotally attaches to the right seat frame at the right seat base frame member 112. The left base frame member 62 of the middle seat 18 pivotally attaches to the left seat frame at the left seat base frame member 142. In the illustrated embodiment, the right base frame member 60 attaches to the right seat base frame member 112 adjacent the second end 68 of the right base frame member. Similarly, the left base frame member 62 pivotally attaches to the left seat base frame member 142 at the second end 72 of the left seat base frame member. The right base frame member 60 of the middle seat 18 is pivotable toward the floor 12 with respect to the right seat frame, and more particularly the right seat base frame member 112. Likewise, the left base frame member 62 of the middle seat 18 is also pivotable toward the floor 12 of the vehicle with respect to the left seat frame, and more particularly the left seat base frame member 142.

As seen in FIG. 4, the base frame members 60 and 62 of the middle seat 18 are each pivotable about at least two generally horizontal axes. For example, the right base frame member 60 of the middle seat 18 pivots about a right generally horizontal axis 150 with respect to right seat base frame member 112 and the right base frame member 60 pivots about the central horizontal axis 74 with respect to the left base frame member 62. Similarly, the left base frame member 62 of the middle seat 18 pivots with respect to the left seat base frame member 142 about a left generally horizontal axis 152 and the left base frame member 62 pivots about the central horizontal axis 74 with respect to the right base frame member 60.

With reference to FIGS. 5 and 6, the right back frame member 80 of the middle seat 18 pivotally attaches to the right seat frame at the right seat back frame member 116. The left back frame member 82 of the middle seat 18 pivotally attaches to the left seat frame at the left seat back frame member 146. In the illustrated embodiment, the right back frame member 80 attaches to the right seat back frame member 116 adjacent the second end 88 of the right back frame member. Similarly, the left back frame member 82 pivotally attaches to the left seat back frame member 146 at the second end 92 of the left seat back frame member. The right back frame member 80 of the middle seat 18 is pivotable toward the rear of the vehicle with respect to the right seat frame, and more particularly the right seat back frame member 116. Likewise, the left back frame member 82 of the middle seat 18 is also pivotable toward the rear of the vehicle with respect to the left seat frame, and more particularly the left seat back frame member 146.

As seen in FIG. 6, the back frame members 80 and 82 of the middle seat 18 are each pivotable about at least two generally vertical axes. For example, the right back frame member 80 of the middle seat 18 pivots about a right generally vertical axis 170 with respect to right seat back frame member 116 and the right back frame member 80 pivots about the central vertical axis 94 with respect to the left back frame member 82. Similarly, the left back frame member 82 of the middle seat 18 pivots with respect to the left seat back frame member 146 about a left generally vertical axis 172 and the left back frame member 82 pivots about the central vertical axis 94 with respect to the right back frame member 80.

Figure 7:
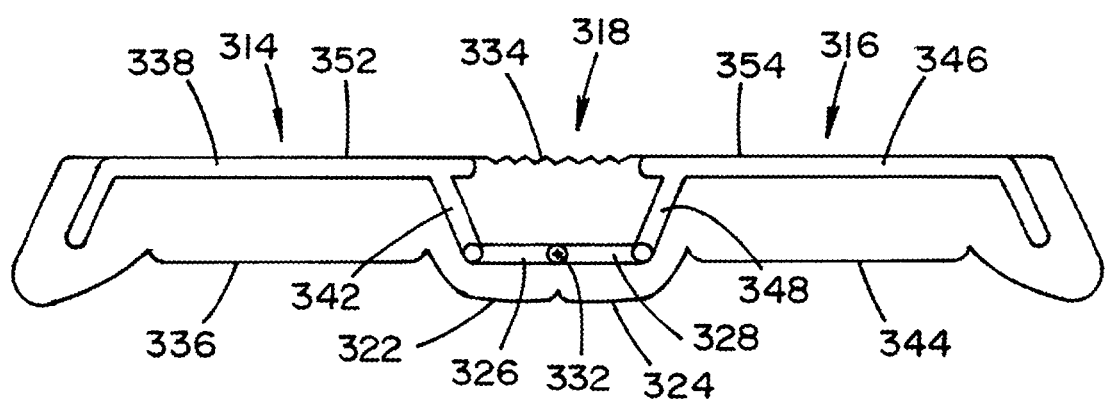
FIG. 7 is a cross-sectional view similar to FIG. 5 showing an alternative embodiment of the seats in the row of seats.
Figure 8:
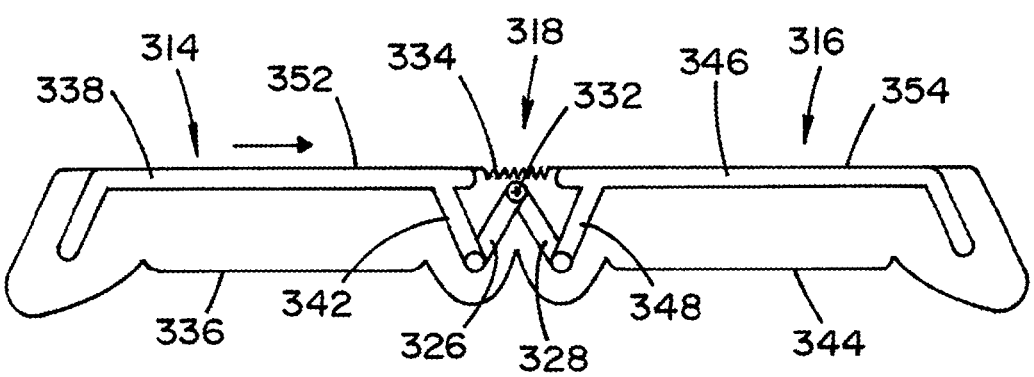
FIG. 8 is a cross-sectional view similar to FIG. 6 showing the alternative embodiment of the seats in the row of seats.

With reference to FIG. 6, when the middle seat 18 is in the collapsed position the rear surfaces 54 and 56 of the middle seat extend rearward beyond the rear surfaces 108 and 138 of the right seat 14 and the left seat 16, respectively. FIGS. 7 and 8 depict an alternative embodiment of a seating arrangement including a right seat 314, a left seat 316 and a middle seat 318. In this embodiment, the right seat 314, the left seat 316 and the middle seat 318 are similar to the right seat 14, the left seat 16 and the middle seat 18 described above with modifications that will be described in more detail below. Only the seat backs of the seats 314, 316 and 318 are shown in FIG. 7; the seats do, however, include seat bases.

The middle seat 318 includes a right seat back section 322 and a left seat back section 324. The middle seat 318 also includes a right back frame member 326 pivotally connected to a left back frame member 328 for rotation about a generally vertical pivot axis 332. The back frame members 326 and 328 are similar to the back frame members 80 and 82 described above. The middle seat 318 in the embodiment depicted in FIGS. 6 and 7; however, differs from the embodiment described above in that the middle seat 318 includes an accordion-like rear section 334 that compresses when in the collapsed state (see FIG. 8).

The right seat 314 includes a seat back 336 and a right seat back frame member 338. The right seat back frame member 338 includes an inboard extension 342, which differs from the right seat back frame member 116 described above. The left seat 316 includes a seat back 344 and a left seat back frame member 346. The left seat back frame member 346 includes an inboard extension 348, which differs from the left seat back frame member 146 described above. The inboard extensions 342 and 348 extend forwardly with respect to the respective seat back frame members 338 and 342. Due to this configuration, the pivot axis 332 does not extend rearward of a rear surface 352 of the right seat back 336 and rearward of a rear surface 354 of the left seat back 344 when the middle seat 318 is in the collapsed state (see FIG. 8).

With reference back to FIG. 1, the vehicle seating arrangement also includes a release handle 200. Actuation of the release handle 200 by an operator allows the right seat 14 to be moved laterally toward the left seat 16. For example, the handle 200 is moveable between an initial position (shown in FIG. 1) and an actuated position (shown in FIG. 2). When in the initial position, movement of at least one seat, e.g. the right seat 14, toward the other seat, e.g. the left seat 16, is precluded. When in the actuated position (shown in FIG. 2) movement of the at least one seat, for example the right seat 14, toward the other seat, for example the left seat 16, is allowed. In the illustrated embodiment, the release handle 200 mounts to the right seat 14 at the right seat base 100. Alternatively, the release handle can mount elsewhere, such as to the left seat 16, the middle seat 18 and/or the vehicle body 10.

With reference to FIG. 3, the vehicle seating arrangement also includes a latch element 202 operably connected with the release handle 200. Movement of the release handle 200 results in movement of the latch element 202. In the illustrated embodiment, the handle 200 operably connects with the latch element 202 via a cable 204 (depicted schematically in FIG. 3). The latch element 202 selectively engages at least two receptacles 206 and 208 that are found in the vehicle floor 12 and are laterally spaced from one another. With reference to FIG. 3, the latch element 202 is received in the outboard receptacle 206 when in the three-passenger mode. When in the two-passenger mode, which is depicted in FIG. 4, the latch element 202 is received in the inboard receptacle 208.

The latch element 202 and receptacles 206 and 208 are merely examples of components for fixing the left seat 14 with respect to the vehicle floor 12. Other latch elements and components that receive the latch elements can be provided. These latch elements can selectively engage at least two components fixed to the vehicle body where the at least two components include a striker or other similar device. Where the latch element engages a striker, it may take a configuration different than the bar-shaped or rod-shaped configuration depicted schematically in FIGS. 3 and 4.

Alternatively or in addition to the latch element 202 described above, a latching mechanism such as a latch element 220 (FIG. 9) can be connected to a handle similar to the handle 200 via a cable (not shown) or other linkage. The latch element 220 can connect with the right base frame member 60 (or the right back frame member 80) and the left base frame member 62 (or the left back frame member 82) to inhibit pivotal movement of the respective members about the pivot axis 74 (or the pivot axis 94). The latch element 220 can attach to the right base frame member 60 via a pin 222 and can include a protuberance 224 (or a hook) that is received in a notch 226 found in the left base frame member 80. When the latch element 220 engages both members 60 and 62, pivotal movement of the member 60 with respect to the member 62 is precluded, and therefore the middle seat 18 does not collapse.

Figure 10:
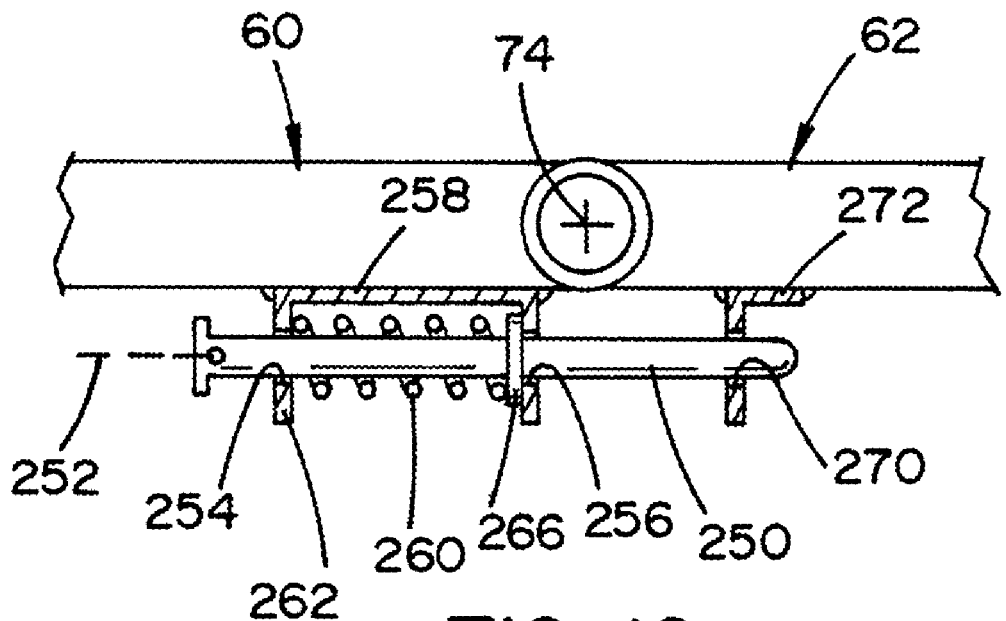
FIG. 10 is a schematic view of an alternative latch mechanism for a seating arrangement.

With reference to FIG. 10, a latch element, such as a pin 250, can be connected to the handle 200 via a cable 252 (depicted schematically). The pin 250 is received through a first hole 254 that is aligned with a second hole 256 in a U-shaped bracket 258. The U-shaped bracket 258 is fixed to the right base frame member 60 (or the right back frame member 80). A spring 260 acts against a first leg 262 of the U-shaped bracket 258 and a washer 266 fixed to the pin 250. The spring 260 urges the pin 250 towards the right per the orientation shown in FIG. 10. The pin 250 is selectively received in an opening 270 formed in a bracket 272 that is fixed to the left base frame member 62 (or the left back frame member 82) to inhibit pivotal movement of the respective members about the pivot axis 74 (or the pivot axis 94).

Figure 9:
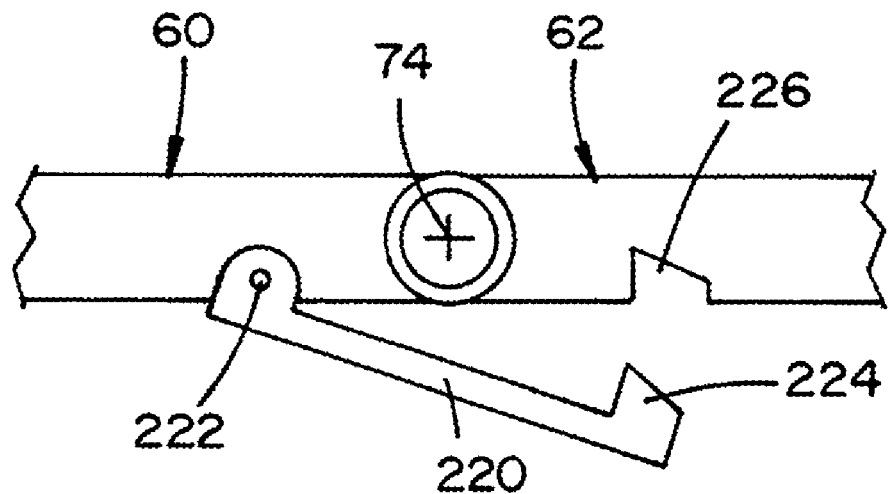
FIG. 9 is a schematic view of a latch mechanism for the seating arrangement.

To collapse the middle seat 18, an operator actuates the handle 200, which disengages the right seat 14 so that the right seat can move laterally with respect to the vehicle body 10. As seen in FIG. 1, the vehicle floor 12 includes tracks 230 that are elongated in the lateral direction and receive the legs 114 of the right seat 14. With the handle 200 being actuated, the legs 114 are movable in the tracks 230, which allows the right seat 14 to move towards the left seat 16. When the right seat 14 is moved toward the left seat 16, both the right seat and the left seat apply a lateral force to the middle seat 18 collapsing the middle seat 18. With reference to FIG. 9, actuation of the handle 200 (FIG. 1) can also pivot the hook 224 out of the notch 226. With reference to FIG. 10, actuation of the handle 200 (FIG. 1) can also pull the pin 250 out of the opening 270 formed in the bracket 272.

The vehicle seating arrangement, a method for changing a seating arrangement in a vehicle, and a collapsible seat have been described above with reference to the illustrated embodiments. The appended claims, however, are not limited to only the embodiments described above. It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:
   a first seat connected with a vehicle body of the vehicle;
   a collapsible seat connected with the vehicle body, disposed adjacent the first seat and movable from an uncollapsed state to a collapsed state, the collapsible seat including a first frame member pivotally attached to a second frame member for rotation about a pivot axis and a right seat section defining a right occupant-supporting surface and a left seat section defining a left occupant-supporting surface, the occupant-supporting surfaces being configured to contact an associated occupant of the collapsible seat when the collapsible seat is in the uncollapsed state and the right seat base section folds toward the left seat base section when a lateral force is applied to the collapsible seat by the first seat;
   a release handle mounted to at least one of the first seat and the vehicle body;
   a first latch element operably connected with the release handle and engaging the first seat and the vehicle body, wherein movement of the release handle results in movement of the first latch element; and
   a second latch element operably connected with the release handle and engaging the first frame member and the second frame member to inhibit pivotal movement of the first frame member with respect to the second frame member about the pivot axis, wherein movement of the release handle results in movement of the second latch element.

2. The vehicle of claim 1, wherein the first seat is moveable laterally with respect to the vehicle body for applying the lateral force to the collapsible seat.

3. The vehicle of claim 1, further comprising a second seat longitudinally aligned with the first seat and the collapsible seat.

4. The vehicle of claim 3, wherein the collapsible seat is disposed between the first seat and the second seat, wherein the first seat moves toward the second seat as the collapsible seat moves from the uncollapsed state to the collapsed state.

5. The vehicle of claim 1, wherein the right seat section includes a right seat base section defining a right seating surface and a right seat back section defining a right back-resting surface, wherein the left seat section includes a left seat base section defining a left seating surface and a left seat back section defining a left back-resting surface, wherein the right seating surface faces the left seating surface and the right back-resting surface faces the left back-resting surface when in the collapsed state.

6. The vehicle seat of claim 5, wherein the right seat base section pivots with respect to the left seat base section about a generally horizontal axis that is generally perpendicular to a lateral direction, and wherein the right seat back section pivots with respect to the left seat back section about a generally vertical axis that is generally perpendicular to the lateral direction.

7. A vehicle comprising:
   a right seat connected with a vehicle body of the vehicle and including a right seat frame back member and a forwardly extending right inboard extension;

a left seat connected with the vehicle body and including a left seat frame back member and a forwardly extending left inboard extension;

a middle seat positioned between the right seat and the left seat, wherein at least one of the right seat and the left seat is movable in a lateral direction with respect to the other seat and the vehicle body, movement of the at least one seat toward the other seat results in a lateral force being applied to the middle seat to collapse the middle seat, wherein the middle seat includes a first back frame member pivotally attached to a second back frame member for rotation about a pivot axis that is generally perpendicular to the lateral direction, wherein the first back frame member pivotally attaches to the right inboard extension and the second back frame member pivotally attaches to the left inboard extension, wherein the pivot axis does not extend rearward of a rear surface of each respective seat back of the right seat and the left seat when the middle seat is in a collapsed state, wherein the first back frame member is pivotable toward a rear end of the vehicle with respect to the right seat frame and the second back frame member is pivotable toward the rear end of the vehicle with respect to the left seat frame.

8. The vehicle of claim 7, wherein the middle seat includes a first base frame member pivotally attached to a second base frame member, wherein each frame member is pivotable about a pivot axis that is generally perpendicular to the lateral direction.

9. The vehicle of claim 8, wherein the base frame members each are pivotable about a generally horizontal axis and the back frame members each are pivotable about a generally vertical axis.

10. The vehicle of claim 9, wherein the base frame members each are pivotable about at least two generally horizontal axes and the back frame members each are pivotable about at least two generally vertical axes.

11. The vehicle of claim 10, wherein the right seat includes a right seat base frame member, wherein the left seat includes a left seat base frame member, wherein the first base frame member pivotally attaches to the right seat base frame member, wherein the second base frame member pivotally attaches to the left seat base frame member.

12. The vehicle of claim 7, wherein the middle seat includes a right seat base section defining a right seating surface and a left seat base section defining a left seating surface, the seating surfaces being configured to contact an associated occupant of the middle seat, wherein the middle seat includes a right seat back section defining a right back-resting surface and a left seat back section defining a left back-resting surface, the back-resting surfaces being configured to contact the associated occupant of the middle seat, wherein movement of the at least one seat toward the other seat results in the right seating surface moving towards facing the left seating surface, and wherein movement of the at least one seat toward the other seat results in the right back-resting surface moving towards facing the left back-resting surface.

13. The vehicle of claim 7, further comprising a release handle mounted to at least one the right seat, the left seat, the middle seat and the vehicle body and a latch element operably connected with the release handle, wherein movement of the release handle results in movement of the latch element.

14. The vehicle of claim 13, wherein the latch element selectively engages at least one of the right seat, the left seat, the middle seat and the vehicle body.

15. The vehicle of claim 14, wherein the handle is movable between an initial position and an actuated position, when in the initial position movement of the at least one seat toward the other seat is precluded, when in the actuated position movement of the at least one seat toward the other seat is allowed.

* * * * *